United States Patent Office 3,250,673
Patented May 10, 1966

3,250,673
METHODS OF COMBATING INSECTS OF THE GENUS DIABROTICA
Richard W. Bagley, Long Beach, Calif., assignor to Union Carbide Corporation, a corporation of New York
No Drawing. Filed Dec. 10, 1963, Ser. No. 329,370
10 Claims. (Cl. 167—30)

This invention relates to a new chemical method of controlling soil insects. More particularly, the invention is concerned with combating soil insects included within the genus Diabrotica, in the family Chrysomelidae, order Coleoptera.

Several major crop plants are attacked by the small, white, threadlike worms which are the larval stage of the insects of the genus Diabrotica. Thus, the northern corn rootworm (*Diabrotica longicornis* Say) and the western corn rootworm (*Diabrotica virgifera* Le Conte) feed specifically on the root system of corn plants, the southern corn rootworm or spotted cucumber beetle (*Diabrotica undecimpunctata howardi* Barb.) attacks cucurbits and peanut pods as well as corn and other field crops, and the banded cucumber beetle (*Diabrotica balteata* Le Conte) infests sweet potatoes. The insects eat the smaller roots of infested plants completely and form tunnels in the larger roots, thereby weakening or destroying them. Corn plants growing in fields infested with the northern or western corn rootworms make very poor growth and frequently die and, due to their weakened root system, the larger plants will often fall after heavy rain or in a strong wind. In addition to materially reducing the yield of crops growing in even moderately heavily infested soil, these soil insects deleteriosly affect the quality of the harvested crop.

Despite the severe losses caused by these insects and attendant intensive efforts to develop chemical methods for their control, no completely satisfactory compound has been found. Of the great number of general and specific insecticides known, none has provided satisfactory control against the particular species encompassed by the Diabrotica genus. Relatively large quanties of the chlorinated hydrocarbon insecticides initially tried, such as benzene hexachloride and chlordane, were required to give only moderate control and, more importantly, these insect species were found to quickly build up resistance to the chlorinated hydrocarbons. More recently attempts to control insects resistant to the chlorinated hydrocarbons by employing phosphate insecticides such as O,O - diethyl O - (2 - isopropyl - 4 - methyl - 6 - pyrimidinyl) phosphorothioate and O,O-diethyl 5-(ethylthiomethyl) phosphorodithioate similarly resulted in quickly developed insect tolerance to the phosphorus chemicals or in inadequate effectiveness or residual action.

The method of this invention provides superior chemical control of soil insects included in the genus Diabrotica even when using concentrations of chemical that are quite low relative to those required with previously used chemicals. In addition, no increase in insect tolerance to the chemical I employ has been found.

Basically, the method of my invention comprises bringing into contact with the larval stage of the soil insect to be controlled an effective amount 3-isopropylphenyl N-methylcarbamate (also referred to as meta-isopropylphenyl N-methylcarbamate) which has the following structural formula:

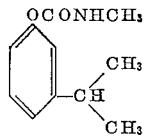

The compound can be prepared by reacting 3-isopropylphenol with about an equimolar amount or an excess of methyl isocyanate, optionally in the contacting presence of from about 0.003 to about 2.0 weight percent, based on the methyl isocyanate, of a tertiary amine catalyst, such as pyridine. The reaction can be conducted at a temperature of from about 20° C. to about 100° C., preferably at from about 20° C. to about 60° C., and at a pressure ranging from atmospheric to about 15 p.s.i.g. Depending primarily on the temperature used, the desired compound is formed in about 2 to about 7 days. The reaction can be carried out in the presence of anhydrous solvents, such as chloroform, benzene or toluene and the desired product can be recovered by crystallization, after excess solvent and catalyst, if any, have been removed by distillation.

Alternatively, 3-isopropylphenyl N-methylcarbamate can be prepared by reacting 3-isopropylphenol or sodium 3-isopropylphenolate with an excess of phosgene at a temperature of from about —40° C. to about 10° C., preferably at from about —30° C. to about —20° C. and a pressure of from atmospheric to about 250 p.s.i.g., but preferably not above about 15 p.s.i.g., for about 3 to about 30 hours, to form 3-isopropylphenyl chloroformate. The reaction is conveniently conducted in the presence of from about 2 to about 10 parts by volume of an aromatic hydrocarbon solvent, such as toluene, benzene, or xylene. The resulting 3-isopropylphenyl chloroformate is then reacted with at least two molecular proportions of methylamine to form the corresponding carbamate. The methylamine addition can be carried out in the presence of from about 100 to 900 volume percent of water, at a temperature of from about 0° C. to about 60° C., preferably from 10° C. to 25° C. and a pressure of from atmospheric to about 100 p.s.i.g., preferably at less than 15 p.s.i.g. The reaction time may vary from about one-half to about twenty hours and the product formed can be recovered by the usual technique, e.g. crystallization.

The following examples are illustrative:

EXAMPLE I

To a pressure bottle were charged 40 grams of meta-isopropylphenol, 100 milliliters of chloroform, 2 drops of pyridine and 30 grams of methyl isocyanate. The bottle was stoppered and, after being allowed to stand at room temperature for one week, it was heated to 65° C. and held at this temperature for two hours. The bottle was then cooled to room temperature, opened, and the pyridine, chloroform and excess methyl isocyanate were distilled off at reduced pressure to a temperature of 60° C. The product remaining crystallized to a crude mass which was recrystallized from hexane to yield approximately 55 grams of 3-isopropylphenyl N-methylcarbamate melting at 70° C. and having the following analysis:

| | Percent C | Percent H | Percent H |
|---|---|---|---|
| Found | 68.2 | 7.62 | 7.58 |
| Theoretical | 68.4 | 7.77 | 7.25 |

The observed value for molecular weight was 197±3 percent, using toluene as a solvent in the Brown-Mill modification of the Menzies-Wright ebullioscopic molecular weight method (theoretical molecular weight is 193).

EXAMPLE II 3-isopropylphenylchloroformate was prepared by the reaction of sodium 3-isopropylphenolate and phosgene. The sodium 3-isopropylphenolate was prepared by the reaction of the free phenol with aqueous sodium hydroxide. A mixture of 272 parts of 3-isopropylphenol, 600 parts distilled water, and 88 parts sodium hydroxide was heated at 90° C. for one hour to complete the formation of sodium 3-isopropylphenolate. This mixture was then cooled to room temperature and was slowly added dropwise to a well agitated mixture of 400 parts of phosgene dissolved in 1000 parts of toluene. The reaction mixture was maintained at −20° C. to −30° C. during the addition and then slowly allowed to come to room temperature (about 25° C.). The organic phase was separated from the salt solution and was then concentrated and distilled. Two hundred and sixty eight parts of 3-isopropylphenylchloroformate boiling at 69° C. at 1 millimeter of mercury were obtained. 3-isopropylphenyl N-methylcarbamate was prepared by slowly adding 210 parts of the 3-isopropylphenylchloroformate thus obtained to a mixture of 250 parts of a 40 percent aqueous methylamine solution and 600 parts of water. This addition was conducted at 20° C. to 25° C. over a half hour period. The reaction mixture was allowed to stand for an additional hour after which the solid product was removed by filtration, washed with water, and dried. The solid 3-isopropylphenyl N-methylcarbamate was recrystallized from hexane to give a yield of 138 parts. The analysis was as follows:

|  | Percent C | Percent H | Percent H |
|---|---|---|---|
| Found | 68.3 | 7.91 | 7.42 |
| Theoretical | 68.4 | 7.77 | 7.25 |

3-isopropylphenyl N-methylcarbamate may be applied to the soil insects in accordance with my invention in a number of ways. It may be applied per se, as a solid in dust form or in spray suspension, or in vaporized form as a fumigant, but it is preferably applied as the toxic component in insecticidal compositions in dust form or in spray suspension, and most preferably in the form of granular formulations.

The exact quantity of 3-isopropylphenyl N-methylcarbamate utilized in such insecticidal compositions will be found to vary rather widely and depends upon the type of compositions in which the material is being employed, method of application, the precise soil insect to be controlled, and other factors commonly encountered in the insecticidal art. While concentrations as low as 0.05 percent may be employed, in general, compositions containing about 0.5 percent by weight, in either a liquid or solid carrier, give excellent results. For some requirements, stronger concentrations may be desirable up to a maximum of about 10 percent. Liquid carriers which may be employed include water, mineral oils and organic solvents. Suitable solid carriers include talc, bentonite, diatomaceous earth, silica, pyrophyllite, fuller's earth, lime, gypsum, fluors, derived from cotton seeds and walnut shells, or any other similar powder. The resulting compositions can be applied as dusts, as liquid sprays or as gas-propelled sprays.

Particularly efficacious compositions for use in my invention are granular formulations prepared by first dissolving 3-isopropylphenyl N-methylcarbamate in an inert organic solvent therefor, such as acetone or toluene, and then spraying the resulting solution onto finely divided solid carrier particles, e.g. vermiculite, attapulgite, pyrophyllite montmorillonite, and then vaporating said solvent from the carrier granules to obtain carrier granules impregnated with the active toxicant.

EXAMPLE III

A granular insecticidal composition was prepared by dissolving 5 grams of 3-isopropylphenyl N-methylcarbamate in 45 milliliters of acetone, spraying the resulting solution onto 30/60 mesh attapulgite granules, and allowing the acetone solvent to evaporate. The resulting granular composition contained 5 percent by weight of active compound.

The composition was applied in eighteen-inch bands over rows of peanut plants (Virginia jumbo runner variety) growing in loamy fine sand infested with the southern corn rootworm. Application of chemical was made months after the planting date at the indicated dosage in pounds of active compound per acre. All treatments were lightly worked into the soil after application. At harvest time the effectiveness of the compound was determined by counting the total number of pegs and pods of the peanut plants and the number of pegs and pods that had been penetrated by the rootworm. The results are set forth in Table I, below.

| Dosage, pounds/acre | Average Percent Penetration [1] of— | | |
|---|---|---|---|
|  | Pegs | Pods | Pegs+Pods |
| 2.0 | 23.1 | 17.1 | 19.4 |
| 3.0 | 14.7 | 24.1 | 14.2 |
| 4.0 | 14.7 | 12.9 | 14.0 |
| 0 (check) | 56.7 | 62.0 | 59.0 |

[1] Each value represents an average of four replicates where one replicate consisted of a randomized block four rows wide and 20 feet long.

Thus, it can be seen that, at a dosage of 4 pounds per acre application of 3-isopropylphenyl N-methylcarbamate resulted in rootworm penetration of only about 14 percent of the pegs and pods of the peanuts whereas use of no chemical resulted in 59 percent penetration.

EXAMPLE IV

Emulsions of 3-isopropylphenyl N-methylcarbamate and DDT (as a standard) in acetone was mixed into screened soil in a ball mill to give the indicated dosages in pounds of active toxicant per acre. Twenty-five second instar larvae of the banded cucumber beetle were caged for one week in the insecticide soil mixture and the degree of kill of the larvae was determined after that time by counting the dead larvae. The results are set forth in Table II, below.

Table II

| Compound | Dosage (pounds/acre) | Percent Mortality |
|---|---|---|
| 3-Isopropylphenyl-N-methylcarbamate | 2 | 100 |
| DDT | 0.5 | 73 |
|  | 10 | 50 |

What is claimed is:
1. The method of combating soil insects of the genus Diabrotica which comprises bringing into contact with the larval stage of the insects an insecticidally effective amount of 3-isopropylphenyl N-methylcarbamate.
2. The method of combating soil insects of the genus Diabrotica which comprises applying to the host soil an insecticidally effective amount of 3-isopropylphenyl N-methylcarbamate.
3. The method of combating the northern and western corn rootworms infesting corn fields which comprises applying to the host soil an insecticidally effective amount of 3-isopropylphenyl N-methylcarbamate.
4. The method of combating the southern corn rootworms infesting peanut fields which comprises applying to the host soil an insecticidally effective amount of 3-isopropylphenyl N-methylcarbamate.
5. The method of combating the banded cucumber beetle infesting sweet potato fields which comprises applying to the host soil an insecticidally effective amount of 3-isopropylphenyl N-methylcarbamate.
6. The method of combating soil insects of the genus Diabrotica which comprises applying to the host soil a granular composition comprising an inert finely divided solid carrier impregnated with an insecticidally effective amount of 3-isopropylphenyl N-methylcarbamate.
7. The method of claim 6 where the carrier is vermiculite.
8. The method of claim 6 where the carrier is attapulgite.

9. The method of claim 6 where the carrier is pyrophyllite.

10. The method of claim 6 where the carrier is montmorillonite.

References Cited by the Examiner

UNITED STATES PATENTS

| 2,903,478 | 9/1959 | Lambrech | 260—479 |
| 3,083,137 | 3/1963 | Weil | 167—30 |
| 3,084,096 | 4/1963 | Lambrech | 167—30 |
| 3,130,122 | 4/1964 | Kuderna et al. | 167—30 |

FOREIGN PATENTS 852,920   11/1960   Great Britain.

OTHER REFERENCES

Kolbezen et al.: "Insecticidal Activity of Carbamate Cholinesterase Inhibitors," Agricultural and Food Chemistry 2 (17); 864–870, August 18, 1954.

LEWIS GOTTS, *Primary Examiner.*

S. K. ROSE, *Assistant Examiner.*